US010582377B2

(12) United States Patent
Takahashi et al.

(10) Patent No.: US 10,582,377 B2
(45) Date of Patent: Mar. 3, 2020

(54) USER EQUIPMENT AND CAPABILITY INFORMATION REPORTING METHOD

(71) Applicant: NTT DOCOMO, INC., Tokyo (JP)

(72) Inventors: Hideaki Takahashi, Tokyo (JP);
Hiromasa Umeda, Tokyo (JP);
Kunihiko Teshima, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 32 days.

(21) Appl. No.: 15/763,000

(22) PCT Filed: Sep. 28, 2016

(86) PCT No.: PCT/JP2016/078586
§ 371 (c)(1),
(2) Date: Mar. 23, 2018

(87) PCT Pub. No.: WO2017/057439
PCT Pub. Date: Apr. 6, 2017

(65) Prior Publication Data
US 2018/0220295 A1   Aug. 2, 2018

(30) Foreign Application Priority Data

Oct. 2, 2015   (JP) ................................ 2015-196876

(51) Int. Cl.
*H04W 8/24*   (2009.01)
*H04W 72/04*   (2009.01)
(Continued)

(52) U.S. Cl.
CPC ............. *H04W 8/24* (2013.01); *H04L 5/0044* (2013.01); *H04L 5/0092* (2013.01);
(Continued)

(58) Field of Classification Search
CPC ............. H04W 72/04; H04W 72/0406; H04W 88/023; H04W 8/24; H04W 72/084; H04L 5/001; H04L 5/0044; H04L 5/0092
See application file for complete search history.

(56) References Cited

U.S. PATENT DOCUMENTS

2014/0092825 A1* 4/2014 Bostrom ............. H04W 72/048
370/329
2015/0296464 A1* 10/2015 Sagae ................... H04W 52/34
455/522
(Continued)

FOREIGN PATENT DOCUMENTS

WO   2014/084245 A1   6/2014

OTHER PUBLICATIONS

International Search Report issued in PCT/JP2016/078586 dated Dec. 20, 2016 (4 pages).
(Continued)

*Primary Examiner* — Mewale A Ambaye
(74) *Attorney, Agent, or Firm* — Osha Liang LLP

(57) ABSTRACT

Techniques are disclosed for controlling carrier aggregation appropriately in a radio communication system having a mixture of harmonic measure equipped user equipments and harmonic measure unequipped user equipments. One aspect of the present invention relates to user equipment having a carrier aggregation function. The user equipment manages requirements regarding transmission and reception characteristics supported by the user equipment for respective combinations of carrier aggregation frequency bands and uses an identifier for identifying a combination of channel bandwidths supported for a combination of inter-band carrier aggregation capable frequency bands to report the requirements as capability information to a base station.

12 Claims, 14 Drawing Sheets

(51) Int. Cl.
*H04L 5/00* (2006.01)
*H04W 88/02* (2009.01)
(52) U.S. Cl.
CPC ....... *H04W 72/04* (2013.01); *H04W 72/0406* (2013.01); *H04W 88/023* (2013.01); *H04L 5/001* (2013.01)

(56) References Cited

U.S. PATENT DOCUMENTS

2015/0327269 A1* 11/2015 Kim .................. H04W 72/0453
370/329
2016/0198452 A1 7/2016 Takahashi et al.
2017/0238163 A1* 8/2017 Chen .................. H04W 72/005
370/328

OTHER PUBLICATIONS

Written Opinion of the International Searching Authority issued in PCT/JP2016/078586 dated Dec. 20, 2016 (3 pages).
RAN4; "LS on capability to distinguish US between with or without HTF"; 3GPP TSG-WG4 Meeting #76bis, R4-156898; Sophia Antipolis, France; Oct. 12-16, 2015 (1 page).
3GPP TS 36.101 V13.0.0; "3rd Generation Partnership Project; Technical Specification Group Radio Access Network; Evolved Universal Terrestrial Radio Access (E-UTRA); User Equipment (UE) radio transmission and reception (Release 13)"; Jul. 2015 (699 pages).
3GPP TS 36.306 V12.1.0; "3rd Generation Partnership Project; Technical Specification Group Radio Access Network; Evolved Universal Terrestrial Radio Access (E-UTRA); User Equipment (UE) radio access capabilities (Release 12)"; Jun. 2014 (30 pages).
3GPP TS 36.331 V12.1.0; "3rd Generation Partnership Project; Technical Specification Group Radio Access Network; Evolved Universal Terrestrial Radio Access (E-UTRA); Radio Resource Control (RRC); Protocol specification (Release 12)"; Mar. 2014 (356 pages).
Extended European Search Report issued in corresponding European Patent Application No. 16851610.2, dated May 4, 2018 (16 pages).
NTT Docomo, Inc., "Implementation of UE capability for CA Rx-TX performance", 3GPP TSG-RAN WG2 #92, R2-156099, Anaheim, USA, Nov. 16-20, 2015 (4 pages).
NTT Docomo, Inc., "Handling of trap filter for CA_B3_B42_B42", 3GPP TSG-RAN WG4 #72-bis, R4-145939, Singapore, Oct. 6-10, 2014 (3 pages).
RAN4, "[Draft] LS on capability to identify different implementation for Class A2", 3GPP TSG-WG4 Meeting #73, R4-147289, San Francisco, US, Nov. 17-21, 2014 (1 page).
Office Action issued in the counterpart Australian Patent Application No. 2016332139, dated Jun. 21, 2018 (3 Pages).

* cited by examiner

FIG.3

6.2.5 Configured transmitted power

Table 6.2.5-2: $\Delta T_{IB,c}$ $\Delta T_{IB,c}$ is the additional tolerance for serving cell $c$ as specified in Table 6.2.5-2; $\Delta T_{IB,c} = 0$ dB otherwise;

| Inter-band CA Configuration | E-UTRA Band | $\Delta T_{IB,c}$ [dB] |
|---|---|---|
| CA_1A-5A | 1 | 0.3 |
|  | 5 | 0.3 |
| CA_4A-12A | 4 | 0.3 |
|  | 12 | 0.8 |

7.3.1A Minimum requirements (QPSK) for CA

Table 7.3.1A-0a: Reference sensitivity for carrier aggregation QPSK $P_{REFSENS, CA}$ (exceptions)

| EUTRA CA Configuration | EUTRA band | Channel bandwidth | | | | | | Duplex mode |
|---|---|---|---|---|---|---|---|---|
| | | 1.4 MHz (dBm) | 3 MHz (dBm) | 5 MHz (dBm) | 10 MHz (dBm) | 15 MHz (dBm) | 20 MHz (dBm) | |
| CA_3A-8A[4] | 3 | | | N/A | N/A | N/A | N/A | FDD |
| | 8 | | | N/A | N/A | | | |
| CA_4A-12A[5,6] | 4 | [-89.2] | [-89.2] | [-90] | [-89.5] | [-89] | [-88.5] | FDD |
| | 12 | | | -96.5 | -93.5 | | | |
| CA_4A-17A[5,6] | 4 | | | [-90] | [-89.5] | | | FDD |
| | 17 | | | -96.5 | -93.5 | | | |

LOSS 0.5 dB DUE TO FILTER IS ADDED TO BAND 12

FOR EXAMPLE, IT IS -100 dBm WITHOUT FILTER, BUT IT IS -90 dBm AND AREA IS REDUCED BY 10 dB

NOTE 1: The transmitter shall be set to $P_{UMAX}$ as defined in subclause 6.2.5A.
NOTE 2: Reference measurement channel is A.3.2 with one sided dynamic OCNG Pattern OP.1 FDD/TDD as described in Annex A.5.1.1/A.5.2.1
NOTE 3: The signal power is specified per port.
NOTE 4: No requirements apply when there is at least one individual RE within the uplink transmission bandwidth of the low band for which the 2nd transmitter harmonic is within the downlink transmission bandwidth of the high band. The reference sensitivity is only verified when this is not the case (the requirements specified in clause 7.3.1 apply).
NOTE 5: These requirements apply when there is at least one individual RE within the uplink transmission bandwidth of the low band for which the 3rd transmitter harmonic is within the downlink transmission bandwidth of the high band.
NOTE 6: The requirements should be verified for UL EARFCN of the low band (superscript LB) such that in MHz and with the carrier frequency of the high band in MHz and the channel bandwidth configured in the low band.

FIG.4

Table 5.6A.1-2:
E-UTRA CA configurations and bandwidth combination sets defined for inter-band CA (two bands)

| E-UTRA CA Configuration | Uplink CA configurations (NOTE 4) | E-UTRA CA configuration / Bandwidth combination set | | | | | | | Maximum aggregated bandwidth [MHz] | Bandwidth combination set |
|---|---|---|---|---|---|---|---|---|---|---|
| | | E-UTRA Bands | 1.4 MHz | 3 MHz | 5 MHz | 10 MHz | 15 MHz | 20 MHz | | |
| CA_1A-5A | CA_1A-5A | 1 | | | | Yes | | | 20 | 0 |
| | | 5 | | | | Yes | | | | |
| | | 1 | | | Yes | Yes | Yes | Yes | 30 | 1 |
| | | 5 | | | Yes | Yes | | | | |

FIG.5

Table 5.6A.1-2:
E-UTRA CA configurations and bandwidth combination sets defined for inter-band CA (two bands)

| E-UTRA CA Configuration | Uplink CA configurations (NOTE 4) | E-UTRA CA configuration / Bandwidth combination set | | | | | | | Maximum aggregated bandwidth [MHz] | Bandwidth combination set |
|---|---|---|---|---|---|---|---|---|---|---|
| | | E-UTRA Bands | 1.4 MHz | 3 MHz | 5 MHz | 10 MHz | 15 MHz | 20 MHz | | |
| CA_1A-8A | CA_1A-8A | 1 | | | Yes | Yes | Yes | Yes | 30 | 0 |
| | | 8 | | | Yes | Yes | | | | |
| | | 1 | | | Yes | Yes | | | 20 | 1 |
| | | 8 | | | Yes | Yes | | | | |
| | | 1 | | | Yes | Yes | Yes | Yes | 30 | 2 |
| | | 8 | | Yes | Yes | Yes | | | | |

FIG.6

*UE-EUTRA-Capability* information element
```
-- ASN1START
<< skip unrelated part >>
BandCombinationParametersExt-r10 ::= SEQUENCE {
    supportedBandwidthCombinationSet-r10  SupportedBandwidthCombinationSet-r10 OPTIONAL
}
SupportedBandwidthCombinationSet-r10 ::=BIT STRING (SIZE (1..maxBandwidthCombSet-r10))
<< skip unrelated part >>
-- ASN1STOP
``` maxBandwidthCombSet-r10   INTEGER  ::= 32   -- Maximum number of bandwidth combination sets per
                                            -- supported band combination

*supportedBandwidthCombinationSet*
The *supportedBandwidthCombinationSet* indicated for a band combination is applicable to all bandwidth classes indicated by the UE in this band combination.
Field encoded as a bit map, where bit N is set to "1" if UE support Bandwidth Combination Set N for this band combination, see 36.101 [42]. The leading / leftmost bit (bit 0) corresponds to the Bandwidth Combination Set 0, the next bit corresponds to the Bandwidth Combination Set 1 and so on. The UE shall neither include the field for a non-CA band combination, nor for a CA band combination for which the UE only supports Bandwidth Combination Set 0.

Table 5.6A.1-2:
E-UTRA CA configurations and bandwidth combination sets defined for inter-band CA (two bands)

| E-UTRA CA Configuration | Uplink CA configurations (NOTE 4) | E-UTRA Bands | 1.4 MHz | 3 MHz | 5 MHz | 10 MHz | 15 MHz | 20 MHz | Maximum aggregated bandwidth [MHz] | Bandwidth combination set |
|---|---|---|---|---|---|---|---|---|---|---|
| CA_3A-8A |  | 3 |  |  |  |  | Yes | Yes | 30 | 0 |
|  |  | 8 |  |  | Yes |  | Yes | Yes |  |  |
|  |  | 3 |  |  |  | Yes | Yes |  | 20 | 1 |
|  |  | 8 |  |  | Yes | Yes |  |  |  |  |
|  | CA_3A-8A | 3 |  | Yes |  | Yes | Yes | Yes | 30 | 2 |
|  |  | 8 |  |  | Yes | Yes | Yes |  |  |  |
|  |  | 3 |  |  |  | Yes | Yes | Yes | 30 | 3 |
|  |  | 8 |  |  | Yes | Yes |  |  |  |  |

THIS COLUMN DOES NOT EXIST IN CURRENT SPECIFICATION

Table 6.2.5-2: $\Delta T_{IB,c}$ (two bands)

| Inter-band CA Configuration | E-UTRA Band | $\Delta T_{IB,c}$ [dB] | Bandwidth combination set |
|---|---|---|---|
| CA_3A-8A | 3 | 0.3 | 0, 1, 2, 3 |
|  | 8 | 0.3 |  |
|  | 3 | 0.3 | 4 |
|  | 8 | 0.8 |  |

Table 7.3.1-1A: $\Delta R_{IB,c}$ (two bands)

| Inter-band CA Configuration | E-UTRA Band | $\Delta R_{IB,c}$ [dB] | Bandwidth combination set |
|---|---|---|---|
| CA_3A-8A | 3 | 0 | 0, 1, 2, 3 |
|  | 8 | 0 |  |
|  | 3 | 0 | 4 |
|  | 8 | 0.2 |  |

(THIS COLUMN DOES NOT EXIST IN CURRENT SPECIFICATION)

Table 7.3.1A-0a: Reference sensitivity for carrier aggregation QPSK $P_{REFSENS, CA}$ (exceptions)

| EUTRA CA Configuration | EUTRA band | Channel bandwidth | | | | | | Duplex mode | Bandwidth combination set |
|---|---|---|---|---|---|---|---|---|---|
| | | 1.4 MHz (dBm) | 3 MHz (dBm) | 5 MHz (dBm) | 10 MHz (dBm) | 15 MHz (dBm) | 20 MHz (dBm) | | |
| CA_3A-8A[4] | 3 |  |  | N/A | N/A | N/A | N/A | FDD | 0, 1, 2, 3 |
|  | 8 |  |  | N/A | -89.4 | -89 | -88.7 |  |  |
| CA_3A-8A | 3 |  |  |  | -94 |  |  | FDD | 4 |
|  | 8 |  |  | -97 |  |  |  |  |  |

NOTE 1: The transmitter shall be set to $P_{UMAX}$ as defined in subclause 6.2.5A.
NOTE 2: Reference measurement channel is A.3.2 with one sided dynamic OCNG Pattern OP.1 FDD/TDD as described in Annex A.5.1.1/A.5.2.1
NOTE 3: The signal power is specified per port
NOTE 4: No requirements apply when there is at least one individual RE within the uplink transmission bandwidth of the low band for which the 2nd transmitter harmonic is within the downlink transmission bandwidth of the high band. The reference sensitivity is only verified when this is not the case (the requirements specified in clause 7.3.1 apply).

FIG.12

Table 7.3.1-1A: $\Delta R_{IB,c}$ (two bands)

| Inter-band CA Configuration | E-UTRA Band | $\Delta R_{IB,c}$ [dB] | Tx-Rx requirement set |
|---|---|---|---|
| CA_3A-8A | 3 | 0 | 0, 1, 2, 3 |
| | 8 | 0 | |
| | 3 | 0 | 4 |
| | 8 | 0.2 | |

(THIS COLUMN DOES NOT EXIST IN CURRENT SPECIFICATION — refers to Tx-Rx requirement set column)

Table 7.3.1A-0a: Reference sensitivity for carrier aggregation QPSK $P_{REFSENS,CA}$ (exceptions)

| EUTRA CA Configuration | EUTRA band | Channel bandwidth | | | | | | Duplex mode | Tx-Rx requirement set |
|---|---|---|---|---|---|---|---|---|---|
| | | 1.4 MHz (dBm) | 3 MHz (dBm) | 5 MHz (dBm) | 10 MHz (dBm) | 15 MHz (dBm) | 20 MHz (dBm) | | |
| CA_3A-8A[4] | 3 | | | N/A | N/A | N/A | N/A | FDD | 0, 1, 2, 3 |
| | 8 | | | N/A | N/A | | | | |
| CA_3A-8A | 3 | | | | -89.4 | -89 | | FDD | 4 |
| | 8 | | | -97 | -94 | | -88.7 | | |

NOTE 1: The transmitter shall be set to $P_{UMAX}$ as defined in subclause 6.2.5A.
NOTE 2: Reference measurement channel is A.3.2 with one sided dynamic OCNG Pattern OP.1 FDD/TDD as described in Annex A.5.1.1/A.5.2.1
NOTE 3: The signal power is specified per port
NOTE 4: No requirements apply when there is at least one individual RE within the uplink transmission bandwidth of the low band for which the 2nd transmitter harmonic is within the downlink transmission bandwidth of the high band. The reference sensitivity is only verified when this is not the case (the requirements specified in clause 7.3.1 apply).

FIG.13

```
UE-EUTRA-Capability information element
-- ASN1START
<< skip unrelated part >>
BandCombinationParametersExt-v10xy ::= SEQUENCE {
    supportedTxRxRequirementSet-r10 SupportedTxRxRequirementSet-r10 OPTIONAL
}
SupportedTxRxRequirementSet-r10 ::= BIT STRING (SIZE (1..maxTxRxReqSet-r10))
<< skip unrelated part >>
-- ASN1STOP
``` maxTxRxReqSet-r10    INTEGER ::= 32   -- Maximum number of TxRx requirement sets per
                                      -- supported band combination supportedTxRxRequirementSet
The *supportedTxRxRequirementSet* indicated for a band combination is applicable to all bandwidth classes indicated by the UE in this band combination.
Field encoded as a bit map, where bit N is set to "1" if UE support Tx-Rx requirement Set N for this band combination, see 36.101 [42]. The leading / leftmost bit (bit 0) corresponds to the Tx-Rx requirement Set 0, the next bit corresponds to the Tx-Rx requirement Set 1 and so on. The UE shall neither include the field for a non-CA band combination, nor for a CA band combination for which the UE only supports Tx-Rx requirement Set 0.

USER EQUIPMENT AND CAPABILITY INFORMATION REPORTING METHOD

TECHNICAL FIELD

The present invention relates to a radio communication system.

BACKGROUND ART

Presently, as a next-generation communication standard of LTE (Long Term Evolution) systems, specifications designed for LTE-Advanced and sophistication thereof are being developed. In LTE-Advanced systems, carrier aggregation (CA) technique is introduced to achieve a higher throughput than that of the LTE systems while ensuring backward compatibility with the LTE systems. In the carrier aggregation, a component carrier (CC) having the maximum bandwidth of 20 MHz supported by the LTE systems is used as a basic component, and it is designed to achieve communication in a broader band by using these multiple component carriers simultaneously.

In the carrier aggregation, user equipment (UE) can use multiple component carriers simultaneously to communicate with abase station (evolved NodeB: eNB). In the carrier aggregation, a highly reliable primary cell (PCell) to ensure connectivity to the user equipment and a secondary cell (SCell) additionally configured for the user equipment during connection to the primary cell are configured. The primary cell is a cell similar to a serving cell in the LTE systems and serves as a cell to ensure connectivity between the user equipment and a network. On the other hand, the secondary cell is a cell configured for the user equipment additionally to the primary cell.

In inter-band carrier aggregation where different frequency bands are simultaneously used, there are cases where influence of harmonics may arise depending on a relative relationship between combinations of frequency bands and frequency positions possessed by operators in these frequency bands. Specifically, the harmonics of a transmission band in a lower-frequency band may fall in a reception band in a higher-frequency band, which may result in sensitivity degradation in the reception band.

In the current LTE standard, it is known that reception sensitivity may degrade for a combination of frequency band 4 (B4) and frequency band 12 (B12) due to the harmonics. In the LTE standard, it is specified that the lower-frequency band 12 is composed of an uplink frequency band (B12 UL) of 699-716 MHz and a downlink frequency band (B12 DL) of 729-746 MHz and the higher-frequency band 4 is composed of an uplink frequency band (B4 UL) of 1710-1755 MHz and a downlink frequency band (B4 DL) of 2110-2155 MHz. For the combination of the frequency band 4 and the frequency band 12, as illustrated in FIG. 1, it is known that a third harmonic arising from transmission in 699-709 MHz in B12 UL may fall in a reception band of 2110-2127 MHz in B4 DL, which may deteriorate the reception sensitivity.

Also, it is known that the reception sensitivity may degrade for a combination of frequency band 3 (B3) and frequency band 8 (B8) due to harmonics. In the LTE standard, it is specified that the lower-frequency band 8 is composed of an uplink frequency band (B8 UL) of 880-915 MHz and a downlink frequency band (B8 DL) of 925-960 MHz and the higher-frequency band 3 is composed of an uplink frequency band (B3 UL) of 1710-1785 MHz and a downlink frequency band (B3 DL) of 1805-1880 MHz. For the combination of the frequency band 3 and the frequency band 8, as illustrated in FIG. 2, it is known that a second harmonic arising from transmission in 905-915 MHz in B8 UL may fall in a reception band of 1810-1830 MHz in B3 DL, which may deteriorate the reception sensitivity.

Currently, a specification based on two patterns is defined for deterioration of the reception sensitivity due to the harmonics. In the first pattern, a low pass filter is inserted in user equipment for measures against the harmonics. The inserted low pass filter cuts the harmonics, and the deterioration of the reception sensitivity in the higher-frequency band is improved. On the other hand, transmission and reception characteristics must be relaxed in compensation. For example, it is assumed that for the combination of the frequency band 4 and the frequency band 12 in the above-stated carrier aggregation, the low pass filter is inserted between a switch and a duplexer for the lower-frequency band 12 in order to cut the harmonics. In the LTE standard, relaxation of the transmission and reception characteristics based on the assumption is designed. Specifically, as illustrated in FIG. 3, a tolerance of the lower bound of the maximum transmission power and reception sensitivity for the frequency band 12 are relaxed. As illustrated, for the combination of the frequency band 4 and the frequency band 12 (CA_4A-12A), the tolerance $\Delta T_{IB,c}$ of the lower bound of the maximum transmission power is set to 0.8 dB, and 0.5 dB corresponding to a loss due to the low pass filter is added compared to other tolerances 0.3 dB. Also, in conjunction with the reception sensitivity, for the combination of the frequency band 4 and the frequency band 12 (CA_4A-12A), the reception sensitivity for the frequency band 4 is set to −90 dBm, which is relaxed by 10 dBm from −100 dBm for the case where the low pass filter is not provided. Correspondingly, the communication area is reduced. The first pattern is applied to cases where the sensitivity may degrade due to the harmonics in actual provision of services by an operator such as the case of the combination of the frequency band 4 and the frequency band 12.

On the other hand, in the second pattern, no measure against the harmonics is taken, although the sensitivity may degrade due to the harmonics as stated above. From the standpoint of positions of frequencies possessed by an operator, there are cases where the sensitivity deterioration due to the harmonics is not problematic in actual provision of services by the operator. Accordingly, no measure against the harmonics such as insertion of a low pass filter is taken, and the relaxation of the transmission and reception characteristics as stated above in conjunction with the first pattern is not specified. For example, it is known that for the combination of the frequency band 3 and the frequency band 8 as illustrated in FIG. 2, the second harmonic arising from transmission in 905-915 MHz in B8 UL may fall in a reception band of 1810-1830 MHz in B3 DL. However, no operator uses these two frequency bands, and the relaxation of the transmission and reception characteristics, as defined for the combination of the frequency band 4 and the frequency band 12 as described with reference to FIG. 3, is not currently specified for the combination of the frequency band 3 and the frequency band 8.

In order to implement the inter-band carrier aggregation, for available combinations of frequency bands, user equipment indicates its supported combinations of frequency bands as capability information to a base station, and the base station configures the inter-band carrier aggregation for the user equipment based on the indicated capability information. For example, it is assumed that a combination of the frequency band 1 having the maximum bandwidth 10 MHz and the frequency band 5 having the maximum bandwidth 20 MHz, that is, the combination (CA_1A-5A) of frequency bands having the maximum bandwidth 30 MHz is available in the inter-band carrier aggregation. Meanwhile, the maximum bandwidth (Maximum aggregated bandwidth) supported by the user equipments in the inter-band carrier aggregation may be different depending on terminal types of the user equipments. In the typical LTE system, there may be a mixture of user equipments supporting the maximum bandwidth 30 MHz (Maximum aggregated bandwidth=30 MHz) and user equipments supporting only the maximum bandwidth 20 MHz (Maximum aggregated bandwidth=20 MHz) in the inter-band carrier aggregation. In the LTE system, information element "Bandwidth combination set" is defined to cause the user equipments to indicate supported combinations of frequency bands together with the maximum bandwidth as the capability information.

As illustrated in FIG. 4, if the user equipment supports the combination of the frequency band 1 and the frequency band 5 and has the maximum bandwidth 20 MHz, the user equipment indicates "Bandwidth combination set=0" together with CA_1A-5A as the capability information to the base station. On the other hand, if the user equipment supports the combination of the frequency band 1 and the frequency band 5 and has the maximum bandwidth 30 MHz, the user equipment indicates "Bandwidth combination set=1" together with CA_1A-5A as the capability information to the base station. Upon receiving the capability information, the base station can identify a channel bandwidth (5 MHz, 10 MHz, 15 MHz, 20 MHz or the like) supported by the user equipment based on the received capability information and configure the inter-band carrier aggregation for the user equipment in accordance with the supported channel bandwidth.

Here, "Bandwidth combination set" may be used for not only differentiation among the terminal types of user equipments as stated above but also other applications. For example, when the available channel bandwidth in the inter-band carrier aggregation is changed, "Bandwidth combination set" is used to indicate the changed combination of frequency bands. For example, it is assumed that two "Maximum aggregated bandwidth" items for 30 MHz and 20 MHz are specified for the combination (CA_1A-8A) of the frequency band 1 and the frequency band 8 available in the inter-band carrier aggregation and they are identified with "Bandwidth combination set=0" and "Bandwidth combination set=1", respectively. Here, as illustrated in FIG. 5, if a channel bandwidth of 3 MHz is newly added to the frequency band 8 for "Maximum aggregated bandwidth" for 30 MHz, "Bandwidth combination set=2" is newly defined for differentiation of the user equipment supporting the channel bandwidth of 3 MHz. In other words, the user equipment supporting the newly added channel bandwidth of 3 MHz indicates "Bandwidth combination set=2" together with CA_1A-8A as the capability information to the base station.

In the LTE system, as illustrated in FIG. 6, "Bandwidth combination set" is indicated in the information element "supportedBandwidthCombinationSet" in the capability information (UE Capability).

PRIOR ART TECHNICAL DOCUMENT

[Non-Patent Document]

Non-patent document 1: 3GPP TS 36.101 V13.0.0 (2015-07)

SUMMARY OF INVENTION

Problem to be Solved by the Invention

The above-stated patterns may be exchanged in the future due to new assignment of frequencies, reorganization of operators or the like. For example, there is a likelihood that as a result of the new assignment of frequencies and/or the reorganization of operators, the case where the sensitivity deterioration due to the harmonics cannot be problematic (the second pattern) may change into the case where the sensitivity deterioration due to the harmonics can be problematic (the first pattern). In this case, a mixture of harmonic measure unequipped user equipments used before the new assignment of frequencies and/or the reorganization of operators and harmonic measure equipped user equipment sold after the new assignment of frequencies and/or the reorganization of operators would exist in a radio communication system. Then, the respective user equipments transmit the same capability information (UE Capability) as carrier aggregation configuration to the network, but the network cannot distinguish between the harmonic measure equipped user equipments and the harmonic measure unequipped user equipments, which have different transmission and reception characteristics, from the transmitted capability information. As a result, the network has difficulty in performing the inter-band carrier aggregation for the user equipments appropriately.

In light of the above-stated problems, an object of the present invention is to provide techniques for controlling carrier aggregation appropriately in a radio communication system including the mixture of the harmonic measure equipped user equipments and the harmonic measure unequipped user equipments.

Means for Solving the Problem

In order to achieve the above object, one aspect of the present invention relates to user equipment having a carrier aggregation function, comprising: a communication control unit configured to control radio communication with a base station; a capability information management unit configured to manage requirements regarding transmission and reception characteristics supported by the user equipment for respective combinations of carrier aggregation frequency bands; and a capability information reporting unit configured to use an identifier for identifying a combination of channel bandwidths supported for a combination of inter-band carrier aggregation capable frequency bands to report the requirements regarding transmission and reception characteristics supported by the user equipment as capability information to the base station.

Another aspect of the present invention relates to a capability information reporting method in user equipment having a carrier aggregation function, comprising: receiving a capability enquiry message from a base station, the capability enquiry message causing requirements regarding transmission and reception characteristics supported by the user equipment for combinations of carrier aggregation frequency bands to be reported; and using an identifier for identifying a combination of channel bandwidths supported for a combination of inter-band carrier aggregation capable frequency bands to report the requirements regarding transmission and reception characteristics supported by the user equipment as capability information to the base station.

Advantage of the Invention

According to the present invention, the techniques for controlling the carrier aggregation appropriately in the radio communication system including the mixture of the harmonic measure equipped user equipments and the harmonic measure unequipped user equipments can be provided.

BRIEF DESCRIPTION OF DRAWINGS

FIG. 3 is a diagram for illustrating an exemplary LTE specification supporting harmonic measures;

FIG. 4 is a diagram for illustrating exemplary capability information for the inter-band carrier aggregation;

FIG. 5 is a diagram for illustrating exemplary capability information for the inter-band carrier aggregation;

FIG. 6 is a diagram for illustrating exemplary signaling of conventional "Bandwidth combination set";

FIG. 10 is a diagram for illustrating exemplary capability information for the inter-band carrier aggregation according to one embodiment of the present invention;

FIG. 11 is a diagram for illustrating exemplary capability information for the inter-band carrier aggregation according to one embodiment of the present invention;

FIG. 12 is a diagram for illustrating exemplary capability information for the inter-band carrier aggregation according to one embodiment of the present invention;

FIG. 13 is a diagram for illustrating exemplary signaling for reporting the capability information according to one embodiment of the present invention;

EMBODIMENTS OF THE INVENTION

Embodiments of the present invention are described below with reference to the drawings.

In embodiments below, user equipment having a carrier aggregation function is disclosed. Summarizing the present invention, one or more requirements regarding transmission and reception characteristics of the user equipment, such as combinations of tolerances of lower bounds of the maximum transmission power and reception sensitivities, for respective combinations of frequency bands in the inter-band carrier aggregation, are specified in a radio communication system, and different requirements are specified for ones of the combinations, the reception sensitivity of which may be deteriorated by harmonics, depending on whether some measures against the harmonics are provided to the user equipment. The user equipment identifies the requirements regarding the transmission and reception characteristics supported by the user equipment from the requirements specified for the radio communication system for the respective combinations of carrier aggregation frequency bands depending on whether the harmonic measures are provided to the user equipment and stores them as the capability information. Upon receiving a capability enquiry message from a base station, the user equipment uses an identifier ("Bandwidth combination set", "Tx-Rx requirement set" or the like) for identifying combinations of channel bandwidths supported for combinations of frequency bands available for the inter-band carrier aggregation to report the stored requirements regarding the transmission and reception characteristics as the capability information to the base station.

As a result, the existing information element "Bandwidth combination set" or "Tx-Rx requirement set" can be used in the radio communication system including a mixture of the harmonic measure equipped user equipments and the harmonic measure unequipped user equipments to control the carrier aggregation for the user equipments appropriately.

Figure 1:
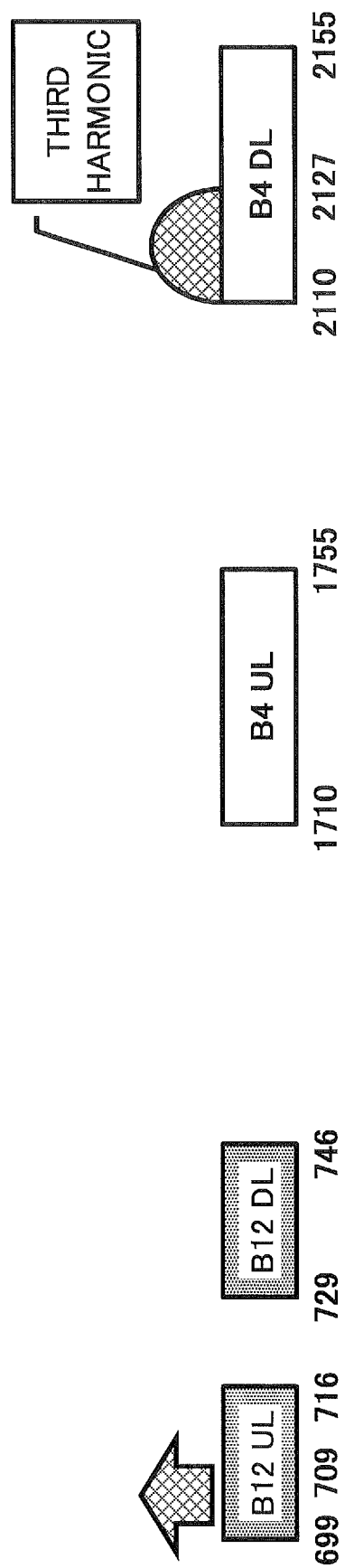
FIG. 1 is a schematic diagram for illustrating exemplary influence of harmonics in inter-band carrier aggregation.
Figure 2:
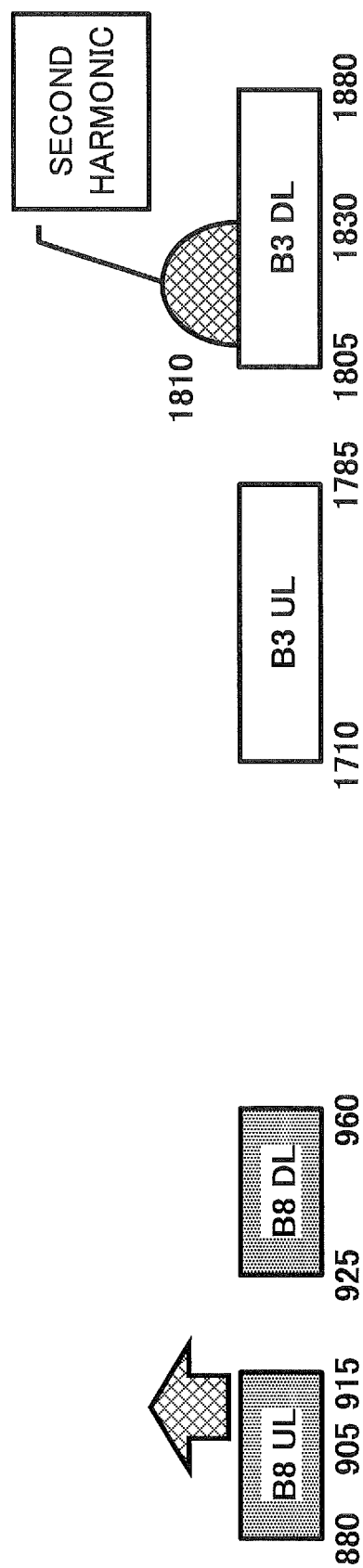
FIG. 2 is a schematic diagram for illustrating exemplary influence of harmonics in inter-band carrier aggregation.
Figure 7:
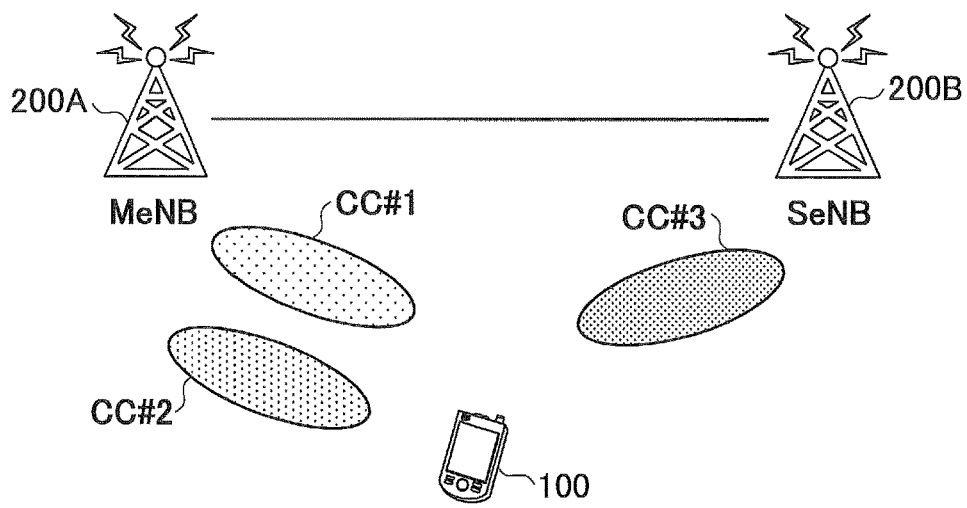
FIG. 7 is a schematic diagram for illustrating a radio communication system according to one embodiment of the present invention.

A radio communication system according to one embodiment of the present invention is described with reference to FIG. 7. FIG. 7 is a schematic diagram for illustrating a radio communication system according to one embodiment of the present invention.

As illustrated in FIG. 7, the radio communication system 10 has user equipment 100 and base stations 200A and 200B (which may be referred to as the base stations 200 hereinafter). The radio communication system 10 supports carrier aggregation where the user equipment 100 uses component carriers CC#1, CC#2 and CC#3 served from the base stations 200A and 200B to perform simultaneous communication.

The user equipment 100 has a carrier aggregation function and can use multiple cells served from one or more base stations 200 to perform the simultaneous communication. As illustrated, the user equipment 100 may communicate in accordance with carrier aggregation using CC#1 and CC#2 served from the single base station 200A simultaneously (intra eNB CA). In the inter-band carrier aggregation, CC#1 and CC#2 are served at different frequency bands. Also, the user equipment 100 may communicate in accordance with dual connectivity using CC#1 and CC#3 served from the two different base stations 200A and 200B, that is, the master base station (MeNB) 200A and the secondary base station (SeNB) 200B. In the inter-band carrier aggregation, CC#1 and CC#3 are served at different frequency bands. In the illustrated embodiment, only the two base stations 200A and 200B are illustrated, but a large number of base stations 200 are generally disposed to cover a service area of the radio communication system 10.

Figure 8:
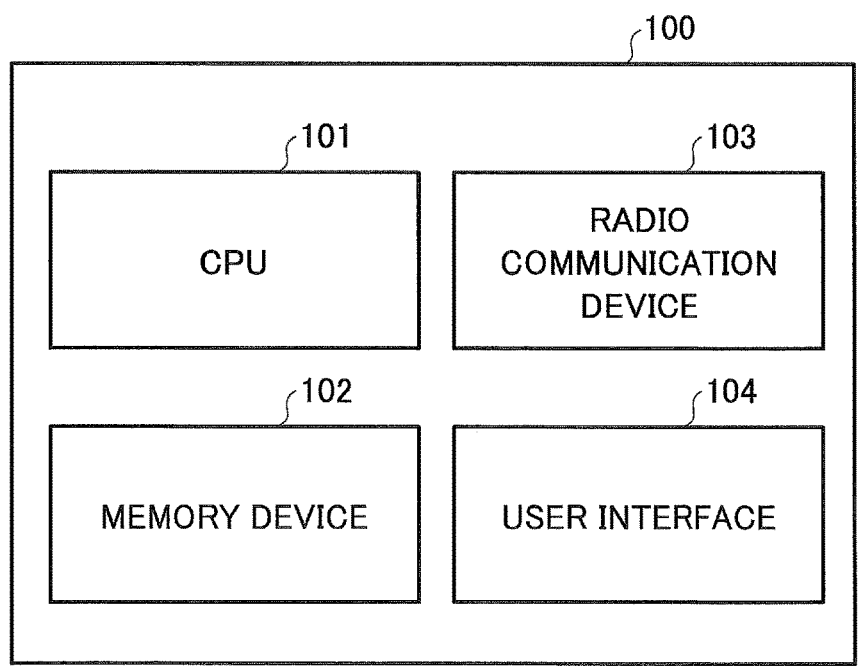
FIG. 8 is a block diagram for illustrating a hardware arrangement of user equipment according to one embodiment of the present invention.

Typically, as illustrated, the user equipment 100 may be any appropriate information processing device with a radio communication function such as a smartphone, a mobile phone, a tablet, a mobile router and a wearable terminal. As illustrated in FIG. 8, the user equipment 100 is arranged with a CPU (Central Processing Unit) 101 such as a processor, a memory device 102 such as a RAM (Random Access Memory) and a flash memory, a radio communication device 103 for transmitting and receiving radio signals to/from the base stations 200A and 200B, a user interface 104 such as an I/O device and a peripheral device and so on. For example, functions and operations of the user equipment 100 as stated below may be implemented by the CPU 101 processing and running data and programs stored in the memory device 102. However, the user equipment 100 is not limited to the above-stated hardware configuration and may be arranged with circuits for implementing one or more of operations as stated below.

The base station 200 performs radio communication with the user equipment 100 in accordance with carrier aggregation to transmit downlink (DL) packets received from network devices, such as an upper station and a server, communicatively connected on a core network (not shown) to the user equipment 100, as well as transmit uplink (UL) packets received from the user equipment 100 to the network devices. In the intra eNB CA, the user equipment 100 uses multiple component carriers served from the base station 200A to perform simultaneous communication. On the other hand, in the dual connectivity CA, the base station 200A serves as a master base station (MeNB) or a primary base station, and the base station 200B serves as a secondary base station (SeNB). In this case, the master base station 200A not only controls the dual connectivity based simultaneous communication between the user equipment 100 and the base stations 200A and 200B but also communication with an upper core network (not shown).

Figure 9:
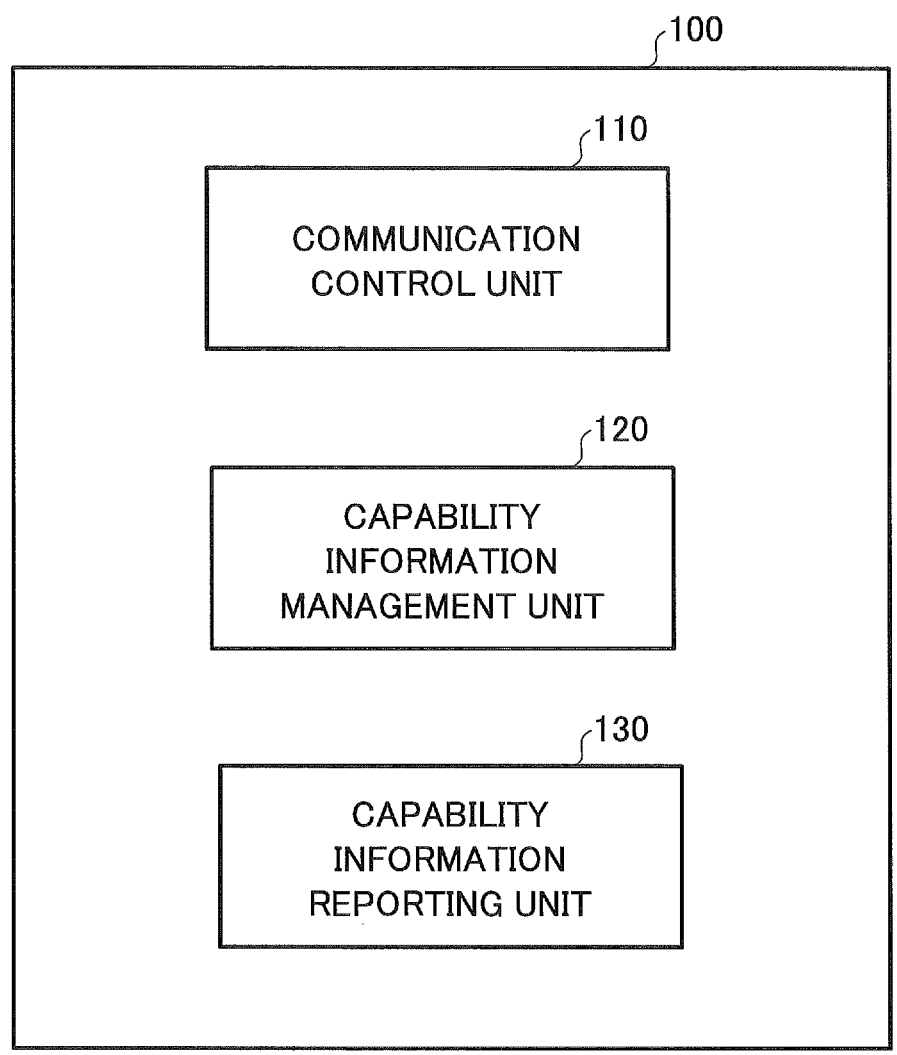
FIG. 9 is a block diagram for illustrating a functional arrangement of the user equipment according to one embodiment of the present invention.

Next, an arrangement of the user equipment according to one embodiment of the present invention is described with reference to FIG. 9. FIG. 9 is a block diagram for illustrating a functional arrangement of the user equipment according to one embodiment of the present invention.

As illustrated in FIG. 9, the user equipment 100 has a communication control unit 110, a capability information management unit 120 and a capability information reporting unit 130.

The communication control unit 110 controls radio communication with the base station 200. Specifically, the communication control unit 110 controls transmission and reception of various radio channels such as uplink/downlink control channels and uplink/downlink data channels to/from the base station 200 to implement the radio communication with the base station 200.

The capability information management unit 120 manages requirements regarding transmission and reception characteristics supported by the user equipment 100 for respective combinations of carrier aggregation frequency bands. In one embodiment, the transmission and reception characteristics may include a tolerance of a lower bound of the maximum transmission power and a reception sensitivity. For example, in the LTE standard as illustrated in FIG. 3, the tolerance of the lower bound of the maximum transmission power corresponds to $\Delta T_{IB,c}$, and the reception sensitivity corresponds to QPSK $P_{REFSENS,CA}$. However, the transmission and reception characteristics according to the present invention are not limited to them and may be any other appropriate indicator regarding the transmission and reception characteristics.

In one embodiment, one or more requirements regarding the tolerance of the lower bound of the maximum transmission power and the reception sensitivity may be specified by the radio communication system 10 for the respective combinations of carrier aggregation frequency bands, and different ones of the requirements specified for the combination of carrier aggregation frequency bands may correspond to whether a harmonic measure is provided to the user equipment 100. In the exemplary LTE specification as illustrated in FIG. 3, for each combination (CA_4A-12A or the like) of carrier aggregation frequency bands, the unique tolerance $\Delta T_{IB,c}$ of the lower bound of the maximum transmission power is specified, and the unique reception sensitivity QPSK $P_{REFSENS,CA}$ corresponding to each channel bandwidth is specified. On the other hand, according to the present embodiment, for a combination of frequency bands where the reception sensitivity may degrade due to harmonics, two or more different requirements regarding the tolerance of the lower bound of the maximum transmission power and the reception sensitivity corresponding to whether a harmonic measure is provided to the user equipment 100 are specified in the radio communication system 10. For example, a requirement ($\Delta T_{IB,c}$, QPSK $P_{REFSENS,CA}$) for unrelaxed transmission and reception characteristics may be specified for the harmonic measure unequipped user equipment 100 whereas a requirement ($\Delta T_{IB,c}+\delta_T$, QPSK $P_{REFSENS,CA}+\delta_P$) for relaxed transmission and reception characteristics may be specified for the harmonic measure equipped user equipment 100. In the case where the two different requirements are specified in the radio communication system 10, the capability information management unit 120 stores one of the two specified requirements corresponding to whether the harmonic measure is provided to the user equipment 100.

For example, if the harmonic measure for the combination of carrier aggregation frequency bands, where the reception sensitivity may degrade due to the harmonics, is provided to the user equipment 100, the capability information management unit 120 may store the requirement ($\Delta T_{IB,c}+\delta_T$, QPSK $P_{REFSENS,CA}+\delta_P$) for relaxed transmission and reception characteristics for the combination as the requirement regarding the transmission and reception characteristics supported by the user equipment 100. On the other hand, if the harmonic measure for the combination of carrier aggregation frequency bands, where the reception sensitivity may degrade due to the harmonics, is not provided to the user equipment 100, the capability information management unit 120 may store the requirement ($\Delta T_{IB,c}$, QPSK $P_{REFSENS,CA}$) for unrelaxed transmission and reception characteristics for the combination as the requirement regarding the transmission and reception characteristics supported by the user equipment 100.

Here, for combinations of carrier aggregation frequency bands where the reception sensitivity does not degrade due to the harmonics, the radio communication system 10 may specify only the unique requirements. In this manner, the capability information management unit 120 identifies the requirement regarding the tolerance of the lower bound of the maximum transmission power and the reception sensitivity supported by the user equipment 100 from one or more requirements specified for the respective combinations of carrier aggregation frequency bands and stores the identified requirement.

In one embodiment, the harmonic measure may be installation of a low pass filter into the user equipment 100. Specifically, it may be determined that if the low pass filter for a lower frequency band is installed in the user equipment 100, the harmonic measure is provided. On the other hand, it may be determined that if the low pass filter is not installed, the harmonic measure is not provided to the user equipment 100. However, the harmonic measure according to the present invention is not limited to the low pass filter and may be any appropriate means that can prevent the harmonic from the lower frequency band from falling in the higher frequency band for the combination of carrier aggregation frequency bands.

The capability information reporting unit 130 uses an identifier for identifying a combination of channel bandwidths supported for a combination of inter-band carrier aggregation capable frequency bands to report the requirements regarding transmission and reception characteristics supported by the user equipment 100 as capability information to the base station 200. Specifically, the capability information reporting unit 130 may extract requirements regarding transmission and reception characteristics for respective combinations stored in the capability information management unit 120 and report the extracted requirements as the capability information to the base station 200 by using the identifier corresponding to the extracted requirements, that is, by selecting values of the identifier in accordance with whether harmonic measures are provided. Also, if one or more to-be-reported combinations of carrier aggregation frequency bands are specified from the base station 200, the capability information reporting unit 130 may extract requirements regarding transmission and reception characteristics for the specified one or more combinations and report the extracted requirements as the capability information to the base station 200 by using the identifier corresponding to the requirements extracted for the respective combinations, that is, by selecting values of the identifier for the respective combinations in accordance with whether the harmonic measures are provided.

In one embodiment, the identifier may be an information element "Bandwidth combination set" in LTE systems. Then, if the harmonic measures are provided to the user equipment 100, the capability information reporting unit 130 may set a predetermined value for the "Bandwidth combination set", and the predetermined value may be associated with one or more of a relaxed tolerance of the lower bound of the maximum transmission power and a relaxed reception sensitivity. Specifically, as illustrated in FIG. 10, for a combination (CA_3A-8A) of inter-band carrier aggregation capable frequency bands 3 and 8, in addition to "Bandwidth combination set=0, 1, 2 and 3" indicative of combinations of channel bandwidths for the harmonic measure unequipped user equipment, "Bandwidth combination set=4" is defined to indicate a combination of channel bandwidths for the harmonic measure equipped user equipment. For example, for "Bandwidth combination set=4", the tolerance $\Delta T_{IB,c}$ of the lower bound of the maximum transmission power is relaxed into 0.8. Also, as illustrated in FIG. 11, for "Bandwidth combination set=4", the reception sensitivity "QPSK $P_{REFSENS,CA}$" is relaxed into 0.2.

If the harmonic measures are provided to the user equipment 100, the capability information reporting unit 130 transmits the capability information ("supportedBandwidthCombinationSet") to the base station 200 by selecting a value of the identifier corresponding to the harmonic measure equipped user equipment, that is, by configuring "Bandwidth combination set=4" for "CA_3A-8A". On the other hand, if the harmonic measures are not provided to the user equipment 100, the capability information reporting unit 130 transmits the capability information ("supportedBandwidthCombinationSet") to the base station 200 by selecting a value of the identifier corresponding to the harmonic measure unequipped user equipment, that is, by configuring "Bandwidth combination set=0, 1, 2 or 3" for "CA_3A-8A".

In the above-stated example, "Bandwidth combination set" is used as the identifier for indicating whether the harmonic measures are provided, but the present invention is not limited to it. In other embodiments, the identifier may be an information element "Tx-Rx requirement set" in LTE systems. Then, if the harmonic measures are provided to the user equipment 100, the capability information reporting unit 130 may set a predetermined value for "Tx-Rx requirement set", and the predetermined value may be associated with a tolerance of a relaxed amount of the reception sensitivity. Specifically, as illustrated in FIG. 12, for the combination (CA_3A-8A) of inter-band carrier aggregation capable frequency bands 3 and 8, in addition to "Tx-Rx requirement set=0, 1, 2 and 3" indicative of the combinations of channel bandwidths for the harmonic measure unequipped user equipment, "Tx-Rx requirement set=4" is specified to indicate the combination of channel bandwidths for the harmonic measure equipped user equipment, and the tolerance $\Delta R_{IB,c}$ of the relaxed amount of reception sensitivity is relaxed into 0.8 for "Tx-Rx requirement set=4".

If the harmonic measures are provided to the user equipment 100, the capability information reporting unit 130 transmits the capability information ("supportedTxRxRequirementSet") to the base station 200 by selecting a value of the identifier corresponding to the harmonic measures equipped user equipment, that is, by configuring "Tx-Rx requirement set=4" for "CA_3A-8A", as illustrated in FIG. 13. On the other hand, if the harmonic measures are not provided to the user equipment 100, the capability information reporting unit 130 transmits the capability information ("supportedTxRxRequirementSet") to the base station 200 by selecting a value of the identifier corresponding to the harmonic measure unequipped user equipment, that is, by configuring "Tx-Rx requirement set=0, 1, 2 or 3" for "CA_3A-8A".

Upon receiving a requirement regarding transmission and reception characteristics supported by the user equipment 100, the base station 200 controls radio communication with the user equipment 100 based on the reported requirement. Specifically, the base station 200 determines whether to configure carrier aggregation depending on the reported requirement or control data scheduling in the configured carrier aggregation. For example, if the requirement for the harmonic measure equipped user equipment, that is, the requirement with relaxed transmission and reception characteristics, is reported, the base station 200 may not configure the carrier aggregation with the combination of frequency bands corresponding to the requirement for the user equipment 100 positioned far away from the base station 200. As stated above, according to the requirement for the harmonic measure equipped user equipment, the communication area is reduced. As a result, even if the carrier aggregation is configured for the user equipment 100 positioned far away from the base station 200, it is a likelihood that the radio communication cannot be successfully achieved.

In one embodiment, when the communication control unit 110 receives a capability enquiry message from the base station 200, the capability information reporting unit 130 may report requirements stored in the capability information management unit 120 for respective combinations of carrier aggregation frequency bands as capability information to the base station 200. For example, upon receiving the capability enquiry message from the base station 200, the capability information reporting unit 130 may report the requirement regarding transmission and reception characteristics supported by the user equipment 100 as the capability information to the base station 200 by setting a value of identifier for "supportedBandwidthCombinationSet" or "supportedTxRxRequirementSet" field in the capability information ("UE-EUTRA-Capability-IE) to indicate that a harmonic measure is provided to the user equipment 100. As a result, the base station 200 can identify the requirement regarding transmission and reception characteristics supported by the user equipment 100.

Whether the harmonic measure is provided to the user equipment 100 may be indicated by some parameters directly without use of the requirement regarding transmission and reception characteristics as stated above. However, it can be considered to be preferable to use the requirements regarding transmission and reception characteristics as stated above from standpoints of consistency with the current specification and/or flexible operations, compared to the case where the new parameters are defined.

Figure 14:
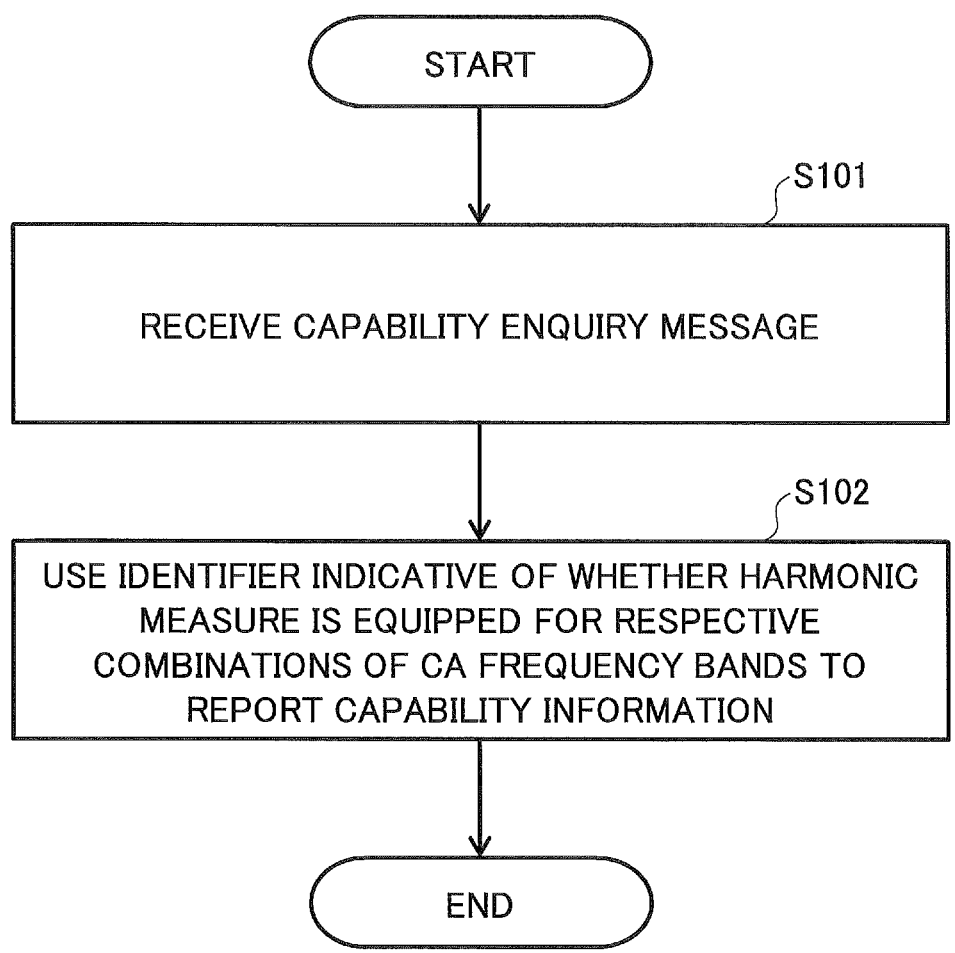
FIG. 14 is a flowchart for illustrating a capability information reporting operation according to one embodiment of the present invention.

Next, capability information reporting operations in the user equipment according to one embodiment of the present invention are described with reference to FIG. 14. FIG. 14 is a flowchart for illustrating a capability information reporting operation according to one embodiment of the present invention.

As illustrated in FIG. 14, at step S101, the communication control unit 110 receives a capability enquiry message from the base station 200 for causing the user equipment 100 to report requirements regarding transmission and reception characteristics supported by the user equipment 100 for combinations of carrier aggregation frequency bands. The capability enquiry message may include an indication for causing the user equipment 100 to report the requirements regarding transmission and reception characteristics supported by the user equipment 100 for respective combinations or some specified combinations of carrier aggregation frequency bands to the base station 200, for example.

At step S102, in response to the received capability enquiry message, the capability information reporting unit 130 uses an identifier for identifying a combination of channel bandwidths supported for a combination of inter-band carrier aggregation capable frequency bands to report the requirements regarding transmission and reception characteristics supported by the user equipment 100 as the capability information to the base station 200. Specifically, the capability information reporting unit 130 extracts the requirement regarding transmission and reception characteristics supported by the user equipment 100 from the capability information management unit 120. If a harmonic measure is provided to the user equipment 100, the capability information reporting unit 130 reports the extracted requirement as the capability information to the base station 200 by setting a predetermined value for the identifier. In one embodiment, the identifier may be the information element "Bandwidth combination set" in LTE systems, and if the harmonic measure is provided to the user equipment 100, the capability information reporting unit 130 transmits the capability information to the base station 200 by setting the predetermined value for "Bandwidth combination set". Here, the predetermined value is associated with one or more of the relaxed tolerance $\Delta T_{IB,c}$ of the lower bound of the maximum transmission power and the relaxed reception sensitivity QPSK $P_{REFSENS,CA}$. In other embodiments, the identifier may be the information element "Tx-Rx requirement set" in LTE, and if the harmonic measure is provided to the user equipment 100, the capability information reporting unit 130 transmits the capability information to the base station 200 by setting a predetermined value for "Tx-Rx requirement set". Here, the predetermined value is associated with the tolerance $\Delta R_{IB,c}$ of the relaxed reception sensitivity. Upon receiving the capability information, the base station 200 can determine whether to configure carrier aggregation or perform data scheduling in the presently configured carrier aggregation based on the reported requirement.

Here, the block diagrams for use in the above description of embodiments show blocks for functional units. These functional blocks (components) are implemented in any combination of hardware and/or software items. Also, the implementations of the respective functional blocks are not particularly limited. In other words, the respective functional blocks may be implemented in a physically and/or logically coupled single device or in multiple devices where two or more physically and/or logically separated devices are connected directly and/or indirectly (for example, in wired and/or wireless manners).

Figure 15:
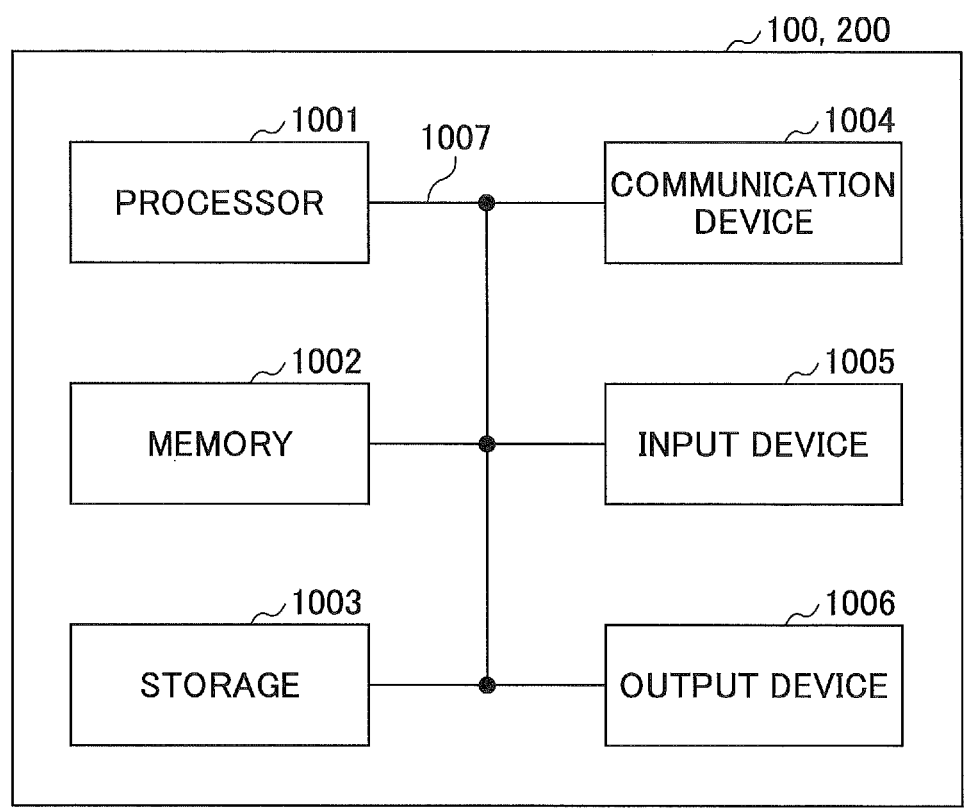
FIG. 15 is a block diagram for illustrating a hardware arrangement of the user equipment and a base station according to one embodiment of the present invention.

For example, the user equipment 100 and the base station 200 according to one embodiment of the present invention may function as a computer processing the radio communication method according to the present invention. FIG. 15 is a block diagram for illustrating a hardware arrangement of the user equipment 100 and the base station 200 according to one embodiment of the present invention. The user equipment 100 and the base station 200 as stated above may each be physically arranged as a computer device including a processor 1001, a memory 1002, a storage 1003, a communication device 1004, an input device 1005, an output device 1006, a bus 1007 or the like.

Note that the language "apparatus" can be interchangeably read as a circuit, a device, a unit or the like. The hardware arrangement of the user equipment 100 and the base station 200 may each be arranged to include one or more of the illustrated devices or without including a part of the devices.

Respective functions in the user equipment 100 and the base station 200 are implemented by loading a predetermined software item (program) into hardware items such as the processor 1001 and the memory 1002 to cause the processor 1001 to execute operations, perform communication with the communication device 1004 and control read and/or write operations on data from/in the memory 1002 and the storage 1003.

The processor 1001 runs an operating system to control the whole computer, for example. The processor 1001 may be arranged with a central processing unit (CPU) including an interface with a peripheral device, a control device, a calculation device, a register and the like. For example, the above-stated components may be implemented in the processor 1001.

Also, the processor 1001 loads programs (program codes), software modules and data from the storage 1003 and/or the communication device 104 into the memory 1002 and executes various operations in accordance with them. As the programs, programs for causing the computer to perform at least a part of operations as described in the above embodiments are used. For example, operations by the components in the user equipment 100 and the base station 200 may be implemented with control programs stored in the memory 1002 and executed by the processor 1001, and other functional blocks may be similarly implemented. It has been described that the above-stated various operations are performed by the single processor 1001, but they may be performed with two or more processors 1001 simultaneously or sequentially. The processor 1001 may be implemented with one or more chips. Note that the programs may be transmitted from a network via an electric communication line.

The memory 1002 is a computer-readable storage medium and may be arranged with at least one of a ROM (Read Only Memory), an EPROM (Erasable Programmable ROM), an EEPROM (Electrically Erasable Programmable ROM), a RAM (Random Access Memory) or the like, for example. The memory 1002 may be referred to as a register, a cache, a main memory (main storage device) or the like. The memory 1002 can store programs (program codes), software modules or the like that can be executed to implement the radio communication method according to one embodiment of the present invention.

The storage 1003 is a computer-readable storage medium and may be arranged with at least one of an optical disk such as a CD-ROM (Compact Disc ROM), a hard disk drive, a flexible disk, a magnetic optical disk (for example, a compact disk, a digital versatile disk, a Blu-ray (registered trademark) disk), a smart card, a flash memory (for example, a card, a stick, a key drive), a floppy (registered trademark), a magnetic strip or the like. The storage 1003 may be referred to as an auxiliary storage device. The above-stated storage medium may be a database or a server including the memory 1002 and/or the storage 1003 or any other appropriate medium.

The communication device 1004 is a hardware item (transceiver device) for communication over computers via a wired and/or wireless network and may be also referred to as a network device, a network controller, a network card, a communication module or the like. For example, the above-stated components may be implemented in the communication device 1004.

The input device 1005 is an input device for receiving external inputs (for example, a keyboard, a mouse, a microphone, a switch, a button, a sensor or the like). The output device 1006 is an output device for providing external outputs (for example, a display, a speaker, a LED ramp or the like). Note that the input device 1005 and the output device 1006 may be integrally arranged (for example, a touch panel).

Also, the respective devices such as the processor 1001 and the memory 1002 are connected with each other via the bus 1007 for communicating information. The bus 1007 may be arranged with a single bus or different buses for different devices.

Also, the user equipment 100 and the base station 200 may be arranged to include a hardware item such as a macro processor, a digital signal processor (DSP), an ASIC (Application Specific Integrated Circuit), a PLD (Programmable Logic Device), a FPGA (Field Programmable Gate Array) or the like, and a part or all of the functional blocks may be implemented in the hardware item. For example, the processor 1001 may be implemented with at least one of these hardware items.

Transmission of information is not limited to the embodiments/implementations as described in the present specification and may be made in any other manner. For example, information may be transmitted in physical layer signaling (for example, DCI (Downlink Control Information) and UCI (Uplink Control Information)), upper layer signaling (for example, RRC (radio Resource Control) signaling, MAC (medium Access Control) signaling, broadcast information (MIB (master Information Block) and SIB (System Information Block)) or any other signal or combinations thereof. Also, the RRC signaling may be referred to as an RRC message and may be an RRC Connection Setup message, an RRC Connection Reconfiguration message or the like.

The respective embodiments/implementations as described in the present specification may be applied to systems using LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA 2000, UMB (Ultra Mobile Broadband), IEEE 802.11 (Wi-Fi), IEEE 802.16 (WiMAX), IEEE 802.20, UWB (Ultra-WideBand), Bluetooth (registered trademark) or any other appropriate system or next-generation systems enhanced based on them.

Procedures, sequences, flowcharts or the like of the respective embodiments/implementations as described in the present specification may be permutable, as long as there is not inconsistency. For example, for methods as described in the present specification, various steps are presented in an exemplary order, and the present invention is not limited to the presented certain order.

Certain operations performed by the base station 200 as described in the present specification may be performed by its upper node in some cases. In a network including one or more network nodes having base stations, various operations performed to communicate with terminals may be apparently performed by the base stations and/or network nodes other than the base stations (for example, a MME or an S-SW can be assumed, but the network nodes are not limited to them). Although it has been described that the single network node other than the base stations is used in the above example, combinations of multiple other network nodes (for example, an MME and an S-GW) may be used.

Information and others may be output from an upper layer (or a lower layer) to a lower layer (or an upper layer). They may be input and output via multiple network nodes.

Incoming and outgoing information and others may be stored in a certain location (for example, a memory) and/or managed in a management table. The incoming and outgoing information and others may be overwritten, updated or added. The outgoing information and others may be deleted. The incoming information and others may be transmitted to other device.

Determination may be made with a one-bit value (0 or 1), a Boolean value (true or false) or numerical comparison (for example, comparison with a predetermined value).

The embodiments/implementations as described in the present specification may be used singularly or in combinations or switched in connection with execution. Also, indication of predetermined information (for example, indication "it is X") is not limited to explicit manners and may be performed implicitly (for example, the predetermined information is not indicated).

Although the present invention has been described in detail, it is apparent to those skilled in the art that the present invention is not limited to the embodiments as described in the present specification. The present invention can be implemented as modifications and variations without departing from the sprit and scope of the present invention as defined in claims. Thus, the description in the present specification is intended for exemplary description and does not mean any restriction to the present invention.

Software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function or the like regardless of the software being referred to as software, a firmware, a middleware, a microcode, a hardware descriptive language or other names.

Also, the software, the instruction or the like may be transmitted and received via a transmission medium. For example, if the software is transmitted from a website, a server or other remote sources by using wired techniques such as a coaxial cable, an optical fiber cable, a twist pair and a digital subscriber line (DSL) and/or wireless techniques such as infrared, radio frequency and microwave, these wired techniques and/or wireless techniques are included within definition of a transmission medium.

Information, signals or the like as described in the present specification may be represented with use of any of various different techniques. For example, data, an instruction, a command, information, a signal, a bit, a symbol, a chip and so on referred to throughout the above description may be represented with a voltage, a current, an electromagnetic wave, a magnetic field, a magnetic particle, an optical field, a photon or any combination thereof.

Note that terminologies described in the present specification and/or terminologies required to understand the present specification may be replaced with terminologies having the same or similar meanings. For example, a channel and/or a symbol may be a signal. Also, the signal may be a message. Also, a component carrier (CC) may be referred to as a carrier frequency, a cell or the like.

The terminologies "system" and "network" for use in the present specification are interchangeably used.

Also, information, a parameter and so on as described in the present specification may be represented with an absolute value, a relative value from a predetermined value or other corresponding information. For example, a radio resource may be specified with an index.

Names as used for the above-stated parameters are not restrictive from any standpoint. Furthermore, there are some cases where formulae and so on using these parameters may be different from ones as explicitly disclosed in the present specification. Various channels (for example, a PUCCH, a PDCCH or the like) and information elements (for example, a TPC or the like) can be identified with any preferred names, and the various names assigned to these various channels and information elements are not restrictive from any standpoint.

A base station can accommodate one or more (for example, three) cells (also referred to as sectors). If the base station accommodates multiple cells, the whole coverage area of the base station can be segmented into multiple smaller areas, and the respective smaller areas can provide communication services with a base station subsystem (for example, indoor small base station RRH: Remote Radio Head). The terminology "cell" or "sector" indicates a part or whole of the coverage area of the base station providing communication services in the coverage and/or the base station subsystem. Furthermore, the terminologies "base station", "eNB", "cell" and "sector" can be interchangeably used in the present specification. The base station may be referred to as terminologies such as a fixed station, a NodeB, an eNodeB (eNB), an access point, a femtocell and a small cell.

A mobile station may be referred to by those skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or any other appropriate terminologies.

There are some cases where terminologies "determining" as used in the present specification may include various operations. The "determining" may include calculating, computing, processing, deriving, investigating, looking up (for example, looking up a table, a database or other data structures) and ascertaining, for example. Also, the "determining" may include receiving (for example, receiving information), transmitting (for example, transmitting information), inputting, outputting and accessing (for example, accessing data in a memory). Also, the "determining" may include resolving, selecting, choosing, establishing, comparing or the like. In other words, the "determining" may include any operation.

The terminologies "connected", "coupled" or all variations thereof mean direct or indirect connection or coupling between two or more elements and can include existence of one or more intermediate elements between two mutually "connected" or "coupled" elements. The coupling or connection between elements may be physical, logical or in combinations thereof. If they are used in the present specification, it can be considered that two elements are mutually "connected" or "coupled" with use of one or more electric wires, cables and/or print electric connections and as several non-limiting and non-comprehensive examples, with use of electromagnetic energy such as electromagnetic energy having a wavelength of a radio frequency domain, a microwave domain and an optical (both visible and invisible) domain.

A reference signal can be omitted as a RS (Reference Signal) and may be referred to as a pilot depending on applied standards.

The recitation "based on" as used in the present specification does not mean "only based on", unless specifically stated otherwise. In other words, the recitation "based on" means both "only based on" and "at least based on".

Any reference to elements with use of terminologies such as "first", "second" and so on as used in the present specification does not limit the amount or order of these elements in general. These terminologies can be used in the present specification as convenient manners for distinguishing between two or more elements. Accordingly, the reference to the first and second elements does not mean that only the two elements are used there or the first element has to precede the second element in any fashion.

The terminology "means" in an arrangement of each apparatus as stated above may be replaced with "unit", "circuit", "device" or the like.

As long as the terminologies "include", "including" and variations thereof are used in the present specification or claims, these terminologies are intended to be inclusive similar to the terminology "comprising". Furthermore, the terminology "or" as used in the present specification or claims is intended not to be an exclusive OR.

A radio frame may be arranged with one or more frames in a time domain. In the time domain, one or more frames each may be referred to as a subframe. The subframe may be further arranged with one or more slots in the time domain. The slot may be further arranged with one or more symbols (OFDM symbols, SC-FDMA symbols and so on) in the time domain. Any of the radio frame, the subframe, the slot and the symbol represents a time unit for transmitting signals. The radio frame, the subframe, the slot and the symbol may be referred to in other corresponding manners. For example, in LTE systems, a base station performs scheduling to assign radio resources (frequency bandwidths, transmission power and so on available in the mobile station) to mobile stations. The minimum time unit for scheduling may be referred to as a TTI (Transmission Time Interval). For example, one subframe, multiple successive subframes or one slot may be referred to as the TTI. A resource block (RB) may be a resource assignment unit in the time domain and the frequency domain and may include one or more successive subcarriers in the frequency domain. Also, in the time domain, the resource block may include one or more symbols and have one slot, one subframe or one TTI in length. The single TTI and subframe each may be arranged with one or more resource blocks. The above-stated arrangement of radio frame is merely exemplary, and the number of subframes in the radio frame, the number of slots in the subframe, the number of symbols and resource blocks in the slot and the number of subcarriers in the resource block can be changed in any manner.

Although the embodiments of the present invention have been described in detail, the present invention is not limited to the above-stated specific embodiments, and various modifications and variations can be made within the spirit of the present invention as recited in claims.

This international patent application is based on Japanese Priority Application No. 2015-196876 filed on Oct. 2, 2015, the entire contents of which are hereby incorporated by reference.

LIST OF REFERENCE SYMBOLS

10: radio communication system
100: user equipment
110: communication control unit
120: capability information management unit
130: capability information reporting unit
200: base station

The invention claimed is:

1. A user equipment having a carrier aggregation function, comprising:
 a processor that controls radio communication with a base station; and
 a transceiver coupled to the processor that manages requirements regarding transmission and reception characteristics supported by the user equipment for respective combinations of carrier aggregation frequency bands; and
 wherein the processor further:
  uses an identifier for identifying a combination of channel bandwidths supported for a combination of inter-band carrier aggregation capable frequency bands and
  reports, by the transceiver, the requirements regarding transmission and reception characteristics supported by the user equipment as capability information to the base station.

2. The user equipment as claimed in claim 1, wherein the transmission and reception characteristics include a tolerance of a lower bound of maximum transmission power and a reception sensitivity.

3. The user equipment as claimed in claim 2, wherein one or more requirements regarding the tolerance of the lower bound of the maximum transmission power and the reception sensitivity are specified by a radio communication system for the respective combinations of carrier aggregation frequency bands, and different ones of the requirements specified for the combination of carrier aggregation frequency bands correspond to whether a harmonic measure is provided to the user equipment.

4. The user equipment as claimed in claim 1, wherein the identifier is an information element "Bandwidth combination set" in LTE.

5. The user equipment as claimed in claim 4, wherein if a harmonic measure is provided to the user equipment, the processor sets a predetermined value for the "Bandwidth combination set", and the predetermined value is associated with one or more of a relaxed tolerance of a lower bound of maximum transmission power and a relaxed reception sensitivity.

6. The user equipment as claimed in claim 1, wherein the identifier is an information element "Tx-Rx requirement set" in LTE.

7. The user equipment as claimed in claim 6, wherein if a harmonic measure is provided to the user equipment, the processor sets a predetermined value for the "Tx-Rx requirement set", and the predetermined value is associated with a tolerance of a relaxed amount of the reception sensitivity.

8. A capability information reporting method in a user equipment having a carrier aggregation function, comprising:
 receiving a capability enquiry message from a base station, the capability enquiry message causing requirements regarding transmission and reception characteristics supported by the user equipment for combinations of carrier aggregation frequency bands to be reported;
 using an identifier for identifying a combination of channel bandwidths supported for a combination of inter-band carrier aggregation capable frequency bands; and
 reporting the requirements regarding transmission and reception characteristics supported by the user equipment as capability information to the base station.

9. The user equipment as claimed in claim 2, wherein the identifier is an information element "Bandwidth combination set" in LTE.

10. The user equipment as claimed in claim 3, wherein the identifier is an information element "Bandwidth combination set" in LTE.

11. The user equipment as claimed in claim 2, wherein the identifier is an information element "Tx-Rx requirement set" in LTE.

12. The user equipment as claimed in claim 3, wherein the identifier is an information element "Tx-Rx requirement set" in LTE.

* * * * *